US 11,223,482 B2

(12) United States Patent
Kroneisen et al.

(10) Patent No.: US 11,223,482 B2
(45) Date of Patent: Jan. 11, 2022

(54) SECURE DATA EXCHANGE

(71) Applicant: SAP SE, Walldorf (DE)

(72) Inventors: Oliver Kroneisen, Frankfurt (DE); Georg Koester, Berlin (DE); Michael Wehrstein, Potsdam (DE); Ricarda Bethge, Potsdam (DE); Arne Scherrer, Kleinmachnow (DE)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 16/416,866

(22) Filed: May 20, 2019

(65) Prior Publication Data
US 2019/0372776 A1 Dec. 5, 2019

(30) Foreign Application Priority Data

Jun. 4, 2018 (DE) .......................... 102018004423.9

(51) Int. Cl.
H04L 29/06 (2006.01)
H04L 9/32 (2006.01)
(Continued)

(52) U.S. Cl.
CPC .......... *H04L 9/3247* (2013.01); *H04L 9/0637* (2013.01); *H04L 9/30* (2013.01); *H04L 9/3242* (2013.01); *H04L 2209/38* (2013.01)

(58) Field of Classification Search
CPC ....... H04L 9/30; H04L 9/3247; H04L 9/3242; H04L 9/0637; H04L 2209/38
See application file for complete search history.

(56) References Cited

U.S. PATENT DOCUMENTS

2017/0005804 A1* 1/2017 Zinder ................ G06F 21/6254
2017/0149819 A1 5/2017 Androulaki et al.
(Continued)

OTHER PUBLICATIONS

Greenspan, Gideon Dr., et al. "MultiChain Private Blockchain—White Paper", Jul. 2015, (pp. 1-17, 17 total pages), URL: https://www.multichain.com/white-paper/[abgerufen am Apr. 26, 2019].
(Continued)

*Primary Examiner* — Joseph P Hirl
*Assistant Examiner* — Leynna Truvan
(74) *Attorney, Agent, or Firm* — Buckley Machoff & Talwalkar LLC

(57) ABSTRACT

A method for secure data exchange is provided. The method comprises: concatenating, by a sender device, data to be exchanged with a random value; obtaining, by the sender device, a hash value of the data concatenated with the random value, using a hash function; digitally signing, by the sender device, the data concatenated with the random value using a private key of a user of the sender device, thereby generating a digital signature of the user of the sender device; storing, in a blockchain by the sender device, the hash value with the digital signature of the user of the sender device; receiving, by a receiver device, data to be verified and the random value; concatenating, by the receiver device, the received data with the random value; obtaining, by the receiver device, a hash value of the received data concatenated with the received random value, using the hash function; determining, by the receiver device, whether or not the hash value of the received data concatenated with the received random value is stored in the blockchain; determining, by the receiver device, that the received data is the data to be exchanged, in case: the hash value of the received data concatenated with the received random value is stored in the blockchain; and the digital signature stored in the blockchain in association with the
(Continued)

hash value of the received data concatenated with the received random value is determined to be valid using a public key of the user of the sender device.

15 Claims, 5 Drawing Sheets

(51) Int. Cl.
*H04L 9/30* (2006.01)
*H04L 9/06* (2006.01)

(56) References Cited

U.S. PATENT DOCUMENTS

2017/0302450 A1    10/2017   Ebrahimi
2018/0101848 A1     4/2018   Castagna et al.

OTHER PUBLICATIONS

"German Search Report", dated Apr. 29, 2019 (Apr. 29, 2019) for German Patent Application No. 10 2018 004 423.9, 16pgs.

* cited by examiner

```
{
    "hash": "13e5468a753135dfad43as5d4f35dsf8",
    "status": "active",
    "signatures": {
        "receiver1": "0d123e58434g16bef76df5a5088375777",
        "receiver2": "324afd23eb5667438b53e324a1055687",
        "receiver3": "98ab89d83bf492945e23958d923854a8"
    }
}
```

FIG 3

SECURE DATA EXCHANGE

CROSS-REFERENCE TO RELATED APPLICATIONS

The present application claims priority under 35 U.S.C. § 119(a) to German Patent Application No. 10 2018 004 423.9, filed Jun. 4, 2018, the contents of which are incorporated herein by reference for all purposes.

FIELD

The application relates to a method, a sender device, a receiver device and a system for secure data exchange as well as a method performed by the sender device and a method performed by the receiver device.

BACKGROUND

A number of techniques have been proposed for exchanging and/or managing data in a secure manner. For example, public-key cryptography enables a sender of data to encrypt and/or digitally sign the data with his/her private key and a receiver of the data to decrypt the data and/or verify the digital signature with a public key corresponding to the private key of the sender. A trust center may be established to verify identification information of users (e.g. potential senders of data) and issue digital certificates each of which certifies that a particular public key belongs to a particular user.

Further, for example, in case of exchanging and/or managing sensitive information related to business (e.g., bank account information), an agency may provide a system to mediate between parties of data exchange and control access to information for each party to the extent that is necessary for the party to perform a particular business activity (e.g., issuance of an invoice, payment according to the invoice, etc.). For instance, payment service providers may receive bank account information of suppliers and handle payments from the buyers to the suppliers without disclosing the bank account information to the buyers. Further, business networks such as Ariba Network provided by SAP Ariba may enable secure electronic transmission of data relating to procurement.

In some circumstances, the exemplary security measures stated above may not be sufficient due to centralization (e.g., single point of failure).

Further, in some circumstances, sensitive information cannot always be transmitted electronically in a secure manner as in the examples as stated above. In other words, insecure communication channels may still be used for exchanging sensitive data.

SUMMARY

According to an aspect, the problem relates to secure exchange of data. The problem is solved by the features disclosed by the independent claims. Further exemplary embodiments are defined by the dependent claims.

According to an aspect, a method for secure data exchange is provided. The method comprises:
  concatenating, by a sender device, data to be exchanged with a random value;
  obtaining, by the sender device, a hash value of the data concatenated with the random value, using a hash function;
  digitally signing, by the sender device, the data concatenated with the random value using a private key of a user of the sender device, thereby generating a digital signature of the user of the sender device;
  storing, in a blockchain by the sender device, the hash value with the digital signature of the user of the sender device;
  receiving, by a receiver device, data to be verified and the random value;
  concatenating, by the receiver device, the received data with the random value;
  obtaining, by the receiver device, a hash value of the received data concatenated with the received random value, using the hash function;
  determining, by the receiver device, whether or not the hash value of the received data concatenated with the received random value is stored in the blockchain;
  determining, by the receiver device, that the received data is the data to be exchanged, in case:
    the hash value of the received data concatenated with the received random value is stored in the blockchain; and
    the digital signature stored in the blockchain in association with the hash value of the received data concatenated with the received random value is determined to be valid using a public key of the user of the sender device.

In some examples, the "random value" may be a numerical value determined randomly. In other examples, the "random value" may include one or more characters determined randomly. The characters may be alphabetic characters, numeric characters, and/or any other symbol(s) that can be processed by a computer.

In various embodiments and examples described herein, the term "hash function" may be understood as a function that maps data of arbitrary size to a bit string of a fixed size and is designed to be a one-way function, in other words, a function which is infeasible to invert. The "hash function" as used herein may be considered as a cryptographic hash function. In the present disclosure, a value returned by the hash function is referred to as a "hash value" or merely as a "hash".

In various embodiments and examples described herein, the process of "digitally signing" data may follow the public-key cryptography technique that employs a pair of keys including a public key and a private key. In the public-key cryptography, the public key and its corresponding private key are different, separate keys but are mathematically linked to each other. The public key may be made available to the public but the private key must be kept secret to parties other than the owner of the key pair. For "digitally signing" data, a hash value of the data to be signed may be obtained using a hash function and the obtained hash value may be encrypted using the private key of the signer (e.g., the sender of the data), for example. The encrypted hash value so obtained may be referred to herein as a "digital signature" of the signer. A receiver of the digital signature associated with the signed data can verify the digital signature by obtaining a hash value of the signed data using the hash function, decrypting the digital signature using the public key of the signer and comparing the obtained hash value with the decrypted value. If the obtained hash value and the decrypted value are identical, the digital signature can be considered valid (e.g., genuinely signed by the signer) and the signed data can be considered intact. If not, the digital signature can be considered invalid and/or the signed data could have been tampered.

In various embodiments and examples described herein, the term "blockchain" may be understood as a distributed (electronic) ledger implemented using the blockchain technology. More specifically, the blockchain may be a ledger that is shared among a plurality of nodes (e.g. computers) constituting a network, wherein each node can directly access (e.g. read and write) the ledger. From some perspective, the blockchain may be considered as a distributed database. A blockchain can be understood as a distributed system in which there is no central administrator. Each node can keep a copy of a "ledger" (i.e., record of transactions) and the copy of the ledger kept by each node is identical to every other node's copy, so that the set of copies can be referred to as a single source of truth. In other words, the blockchain may be understood as being replicated on all the nodes. A blockchain is reliable and transparent, in that transactions are permanently recorded and cannot be revised. For example, data stored in a blockchain cannot be altered or deleted without leaving a trace. Exemplarily, timestamps may be used for this purpose, since a timestamp proves that the data must have existed at the time. The term "transaction" may be used herein to indicate an action or a process that includes one or more changes to the ledger that modify the state of the blockchain. In the following, the term "transaction" will be used to refer both to the action itself and to a definition of the transaction that may be a collection of entities needed for performing the action, such as statements, variables and/or parameters. When a node "sends a transaction" to the blockchain distributed ledger the node may access the ledger in accordance to the action specified in the transaction, e.g., write and/or update the data. By "recording a transaction" in the blockchain, a log of the action performed (e.g., transaction involving writing and/or updating of data) and/or the definition of the transaction may be recorded in the ledger.

In various embodiments and examples described herein, "storing" information in a blockchain (e.g. "storing . . . the hash value and a digital signature" in the blockchain) may result in recording a "transaction" in the blockchain, where the transaction indicates the action of storing the information. The transaction may further include the content of the stored information (e.g., the "hash value and a digital signature").

In the blockchain technology, transactions are grouped into so-called blocks, which will eventually be, after validation via a consensus algorithm, chained together over time in a so-called blockchain. The blocks may be seen as forming a chain because each block contains a reference to the previous block, for example each block contains a hash value of a previous block and a timestamp of when the previous block has been added to the chain.

The validity of a transaction may be verified in the consensus process by checking a digital signature of the transaction. Each node in the network may be associated with an identifier and be provided with a cryptographic pair, private key—public key. All the nodes in the network may have a list of the public keys and the respective identifiers of the other nodes. When a node sends a transaction to the blockchain network, the node signs the transaction with its private key. The transaction may then be broadcast to the other nodes within the network. Thus, the other nodes, using the public key associated with the identifier, can verify the digital signature to check that the communication has not been tampered with. Once the validity of the transaction has been ascertained, the other nodes may create a new block comprising the transaction, signing the block with their private keys, so that the block can be deployed to the blockchain. The consensus process may be carried out by all nodes or only by a pre-selected set of nodes. This means that it may be necessary for all the nodes to sign the block, or only for a part of them.

Since the blockchain is reliable and transparent as stated above, the use of the blockchain as defined in the above-stated method can provide improved security for the data to be exchanged. For example, even when the data is transmitted in a potentially insecure manner (e.g., mail, e-mail, facsimile, etc.), the validity of the received data is determined by accessing the blockchain and checking the corresponding hash value and digital signature.

Further, in the above-stated method for secure data exchange, the data to be exchanged is concatenated with a random value, and a hash value of the data concatenated with the random value is obtained and stored in the blockchain. This can make it more difficult to conjecture the data to be exchanged from the corresponding hash value stored in the blockchain (which can be accessed by the public), thereby improving security for the data to be exchanged.

The random value used for obtaining the hash value is preferably provided to the receiver device without using the blockchain. For example, the random value may be provided to a user of the receiver device (e.g. the intended recipient of the data to be exchanged) via one or more communication means that do not involve the blockchain, such as e-mail, etc.), facsimile and/or mail (e.g. paper letter) etc. The user of the receiver device may then input the random value to the receiver device using an input device (e.g., mouse, touch panel, keyboard, etc.) connected to the receiver device. In some other examples, the random value may be uploaded on a server (outside the blockchain) which is connected to both the sender device and the receiver device via a network (e.g. the Internet) and the user of the receiver device may be notified of a storage location (e.g. indicated by a URL (Uniform Resource Locator)) for the random value. The user can then access the storage location using the receiver device so that the receiver device can download the random value from the server. In yet other examples, the receiver device may receive the random value from the sender device via a network (e.g. the Internet) but without involving the blockchain.

The data to be verified at the receiver device may also be provided to the receiver device without using the blockchain, in a manner analogous to that for the random value as stated above. In some examples, the data to be verified may be provided to the user of the receiver device together with the random value. In other examples, the data to be verified and the random number may be provided to the user of the receiver device separately with different means of communication and/or different points in time.

According to an example, the above-stated method for secure data exchange may further comprise:
  in case the receiver device determines that the received data is the data to be exchanged:
    digitally signing, by the receiver device, at least the received data using a private key of a user of the receiver device, thereby generating a digital signature of the user of the receiver device; and
    storing, in the blockchain by the receiver device, the digital signature of the user of the receiver device, in association with the hash value of the received data concatenated with the received random value.

The digital signature stored in the blockchain by the receiver device in association with the hash value of the data concatenated with the random value may indicate that the user of the receiver device has confirmed that the data corresponding to the hash value stored in the blockchain is legitimate (e.g., the data being intact and from the correct sender).

When the receiver device stores, in the blockchain, the "digital signature of the user of the receiver device, in association with the hash value of the received data concatenated with the received random value", a transaction indicating the storing of the "digital signature" in association with the "hash value" may be recorded in the blockchain. This transaction may also be verified in the consensus process as mentioned above.

Further, in some examples, status information may be further stored in the blockchain in association with the hash value of the data concatenated with the random value. The status information may be set to "pending" when the sender device stores the hash value with the digital signature of the user of the sender device in the blockchain. In other words, the status information may be set to "pending" by default. The status information may be changed from "pending" to "active" when a specified number of digital signatures are stored, by one or more receiver devices, in the blockchain in association with the hash value of the data concatenated with the random value.

In various embodiments and examples described herein, the "status information" may be understood as indicating whether or not the data corresponding to the hash value stored in the blockchain in association with the status information may be used.

The status information of "pending" may indicate that the corresponding data has not yet been confirmed. Further, the status information of "active" may indicate that the corresponding data can be used.

In some examples, the above-stated method may further comprise: setting, by the sender device, the status information stored in the blockchain to outdated when the data corresponding to the status information becomes obsolete.

The receiver device may retrieve, from the blockchain, the status information stored in association with the hash value of the received data concatenated with the received random value. The receiver device may use the status information in further processing the received data.

The above-stated method may further comprise: storing, by the receiver device, the received data in a receiver database connected to the receiver device, in case the receiver device determines that the received data is the data to be exchanged.

Since the storing of the received data in the receiver database may be performed in case the receiver device determines that the received data is the data to be exchanged, the likelihood of inappropriate data being stored in the receiver database can be decreased.

In case the status information as mentioned above is retrieved from the blockchain, the receiver device may store the status information in the receiver database, in addition to and in association with the corresponding received data, for example. In some other examples, the receiver device may determine whether or not to store the received data in the receiver database, according to the status information. For instance, the receiver device may determine to store the received data in the receiver database only if the status information is set to "active". Further, for example, the receiver device may perform the steps of digitally signing at least the received data and of storing the digital signature in the blockchain, only if the status information is set to "pending".

The above-stated method may further comprise:

determining, by the receiver device, that the received data is not the data to be exchanged, in case:
  the hash value of the received data concatenated with the received random value is not stored in the blockchain; or
  the hash value of the received data concatenated with the received random value is stored in the blockchain but the digital signature stored in the blockchain in association with the hash value of the received data concatenated with the received random value is determined to be invalid, using the public key of the user of the sender device; and
if the receiver device determines that the received data is not the data to be exchanged, sending notification information from the receiver device to the sender device.

The notification information from the receiver device to the sender device may indicate, for example, the received data is not legitimate (e.g. may have been tampered). Alternatively or additionally, the notification information from the receiver device may indicate that: the hash value of the received data concatenated with the received random value is not stored in the blockchain, in other words, no stored hash value matches; or the hash value of the received data concatenated with the received random value is stored in the blockchain but the digital signature stored in the blockchain in association with the hash value is determined to be invalid. Such a notification information from the receiver device to the sender device as mentioned above can facilitate the sender of the data to recognize and/or address a fraudulent activity regarding the data.

According to another aspect, a sender device is provided for secure data exchange. The sender device comprises:
  a memory configured to store a private key of a user of the sender device; and
  a processor configured to:
    concatenate data to be exchanged with a random value;
    obtain a hash value of the data concatenated with the random value, using a hash function;
    digitally sign the data concatenated with the random value using the private key stored in the memory, thereby generating a digital signature of the user of the sender device;
    store, in a blockchain, the hash value with the digital signature of the user of the sender device.

According to yet another aspect, a receiver device is provided for secure data exchange. The receiver device comprises:
  a memory configured to store a public key corresponding to a private key of a user of a sender device; and
  a processor configured to:
    receive data to be verified and a random value;
    concatenate the received data with the received random value;
    obtain a hash value of the received data concatenated with the received random value, using a hash function;
    determine whether or not the hash value of the received data concatenated with the received random value is stored in a blockchain, the blockchain storing hash values with digital signatures, at least one of the stored hash values being obtained by the sender device, from data to be exchanged, which is concatenated with the random number, using the hash function, the digital signature stored with the at least one of the stored hash values being obtained by the sender device by digitally signing the data to be exchanged, which is concatenated with the random number, using the private key of the user of the sender device;

determine that the received data is the data to be exchanged, in case:

the hash value of the received data concatenated with the received random value is stored in the blockchain; and the digital signature stored in the blockchain in association with the hash value of the received data concatenated with the received random value is determined to be valid using the public key stored in the memory.

In the above-stated receiver device, the memory may be further configured to store a private key of a user of the receiver device. Moreover, the processor of the above-stated receiver device may be further configured to:

in case the receiver device determines that the received data is the data to be exchanged:

digitally sign at least the received data using the private key stored in the memory, thereby generating a digital signature of the user of the receiver device; and store, in the blockchain, the digital signature of the user of the receiver device, in association with the hash value of the received data concatenated with the received random value.

Further, the processor of the above-stated receiver device may be further configured to: store the received data in a receiver database connected to the receiver device, in case the received data is determined to be the data to be exchanged.

Further, the processor of the above-stated receiver device may be further configured to:

determine that the received data is not the data to be exchanged, in case:

the hash value of the received data concatenated with the received random value is not stored in the blockchain; or the hash value of the received data concatenated with the received random value is stored in the blockchain but the digital signature stored in the blockchain in association with the hash value of the received data concatenated with the received random value is determined to be invalid, using the public key of the user of the sender device; and if the received data is determined not to be the data to be exchanged, send notification information to the sender device.

According to yet another aspect, a system is provided for secure data exchange. The system comprises:

the above-stated sender device;
the above-stated receiver device; and
the blockchain.

According to yet another aspect, a method performed by a sender device for secure data exchange is provided. The method comprises:

concatenating data to be exchanged with a random value;

obtaining a hash value of the data concatenated with the random value, using a hash function;

digitally signing the data concatenated with the random value using a private key of a user of the sender device, thereby generating a digital signature of the user of the sender device;

storing, in a blockchain, the hash value with the digital signature of the user of the sender device.

According to yet another aspect, a method performed by a receiver device for secure data exchange is provided. The method comprises:

receiving data to be verified and a random value;

concatenating the received data to be verified with the received random value;

obtaining a hash value of the received data concatenated with the received random value, using a hash function;

determining whether or not the hash value of the received data concatenated with the received random value is stored in a blockchain, the blockchain storing hash values with digital signatures, at least one of the stored hash values being obtained, by a sender device, from data to be exchanged, which is concatenated with the random number, using the hash function, the digital signature stored with at least one of the stored hash values being obtained by the sender device by digitally signing the data to be exchanged, which is concatenated with the random number, using a private key of the user of the sender device;

determining that the received data is the data to be exchanged, in case:

the hash value of the received data concatenated with the received random value is stored in the blockchain; and the digital signature stored in the blockchain with the hash value of the received data concatenated with the received random value is determined to be valid, using the public key of the user of the sender device.

The subject matter described in the application can be implemented as a method or as a system, possibly in the form of one or more computer program products. The subject matter described in the application can be implemented in a data signal or on a machine readable medium, where the medium is embodied in one or more information carriers, such as a semiconductor memory or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

FIG. 3 shows an example of data associated with an entry in the blockchain.

DETAILED DESCRIPTION OF EMBODIMENTS

In the following text, a detailed description of examples will be given with reference to the drawings. It should be understood that various modifications to the examples may be made. In particular, one or more elements of one example may be combined and used in other examples to form new examples.

Figure 1:
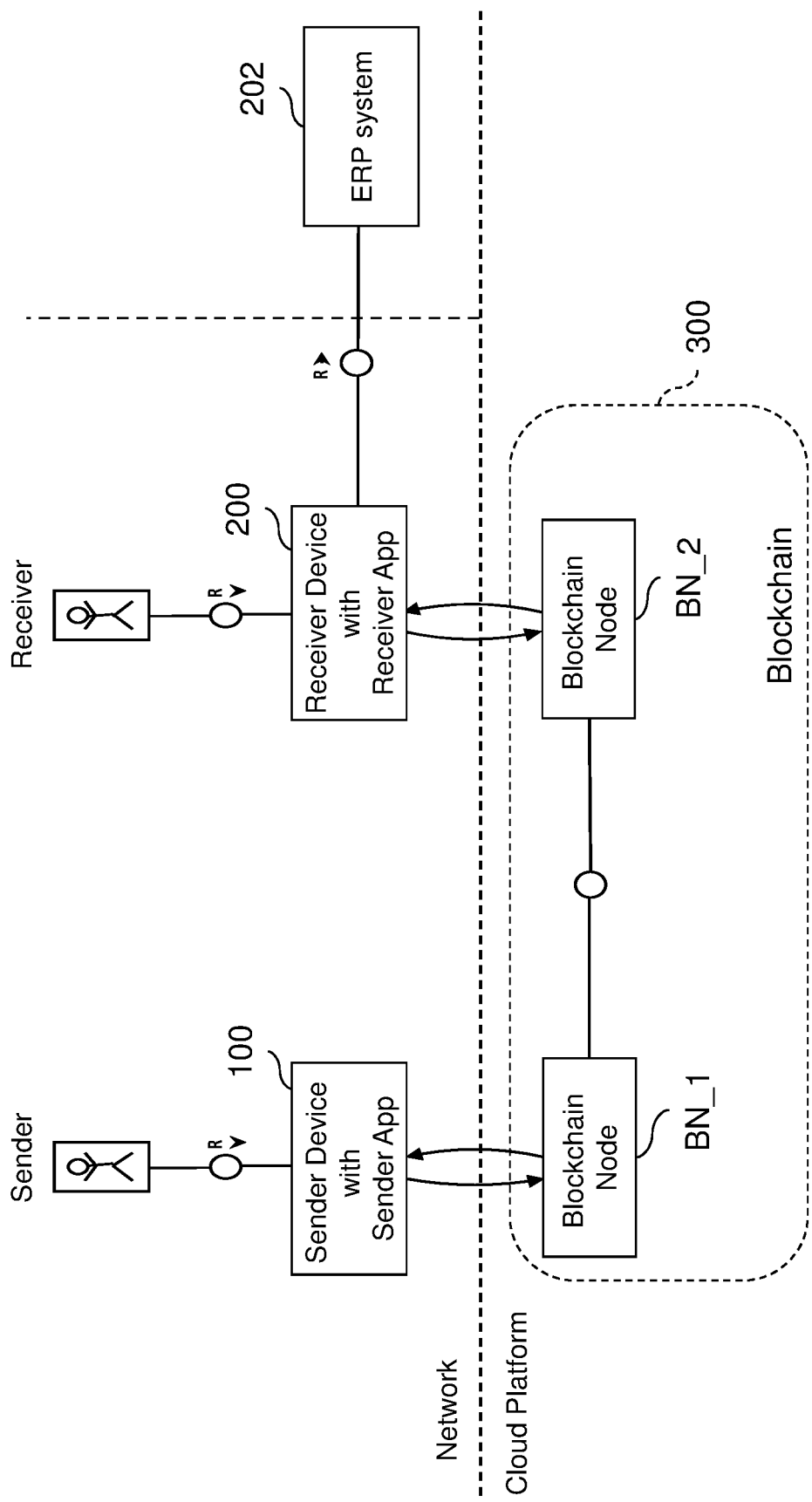
FIG. 1 shows an exemplary system architecture for secure data exchange.

FIG. 1 shows an exemplary system architecture for secure data exchange. The exemplary system may comprise a sender device 100, a receiver device 200 and a blockchain 300.

The sender device 100 may be implemented by a computer with a software application that enables access to the blockchain 300. The software application may enable the sender device 100 to operate a node BN_1 of the blockchain 300. The software application may be a web application that can be run in a web browser. Hereinafter, the software application that enables access to the blockchain 300, installed on the sender device 100, will be referred to as the "sender application". The details of the functions of the sender application will be described later below.

The receiver device 200 may be implemented by a computer with a software application that enables access to the blockchain 300. The software application may enable the receiver device 200 to operate a blockchain node BN_2 of the blockchain 300. The software application may be a web application that can be run in a web browser. Hereinafter, the software application that enables access to the blockchain 300, installed on the receiver device 200, will be referred to as the "receiver application". The details of the functions of the receiver application will be described later below. In some examples, the sender application and the receiver application may comprise the same set of functions and perform different operations depending on whether the application should function as the sender application or the receiver application. In other examples, the sender application and the receiver application may comprise different sets of functions.

The receiver device 200 may be further connected to an ERP (enterprise resources planning) system 202 such as SAP HANA. The ERP system 202 may provide a database management system (DBMS) which may be used to manage one or more databases for the receiver. The one or more databases may be relational or object-relational databases. In some examples, the one or more databases are not accessible for users other than users of the receiver device 200. At least one of the one or more databases managed by the ERP system 202 may be considered as a receiver database connected to the receiver device (e.g. receiver device 200). In some examples, the receiver application may have an integration to the ERP system 202 that may enable the receiver application to query master data in the one or more databases managed by the ERP system 202.

The sender device 100 and the receiver device 200 may be connected to each other via a network such as the Internet or intranet.

In some exemplary use cases, the sender device 100 and the receiver device 200 may belong to a same organization (e.g., company, institute, public or private organization, etc.). In these exemplary use cases, the sender device 100 and the receiver device 200 may be implemented on a single computer or system which can be used by a plurality of users within the same organization. Further, when the sender device 100 and the receiver device 200 belong to the same organization, the ERP system 202 may manage one or more databases for that organization.

In other exemplary use cases, the sender device 100 and the receiver device 200 may belong to different organizations. In the other exemplary use cases, the ERP system 202 may manage one or more databases for the organization which the receiver device 200 belongs to.

The blockchain 300 may be considered as a distributed database that is shared among a plurality of nodes constituting a network, wherein each node can directly access (e.g. read and write) the distributed database. The above-stated blockchain nodes BN_1 and BN_2 operated by the sender device 100 and the receiver device 200, respectively, may be considered as examples of the nodes included in the blockchain 300.

In some examples, nodes of the blockchain 300 may be implemented using an existing platform for building a blockchain such as MultiChain. Specifically, all nodes within the blockchain 300 employed in the exemplary system preferably follow the same blockchain protocol e.g. MultiChain. The nodes of the blockchain 300 may be hosted on a cloud platform such as SAP Cloud Platform. A cloud platform may enable cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment may have one or more of the following characteristics: multitenancy, performance monitoring, virtual resources that are dynamically assignable to different users according to demand, multiple redundant sites, multiple virtual machines, network accessibility (e.g., via. the Internet) from multiple locations (e.g., via a web browser) and devices (e.g., mobile device or PC).

In some other examples, however, the nodes of the blockchain 300 may be implemented on on-premises computing environments, rather than a cloud computing environment.

It should be noted that, although FIG. 1 shows a single sender device 100 and a single receiver device 200, the system may comprise more than one sender devices 100 and more than one receiver devices 200. Further, each of the more than one sender devices 100 and each of the more than one receiver devices 200 may operate its own blockchain node comprised in the blockchain 300. Through the blockchain protocol it can be ensured that data is replicated on every node in the blockchain 300.

Figure 2:
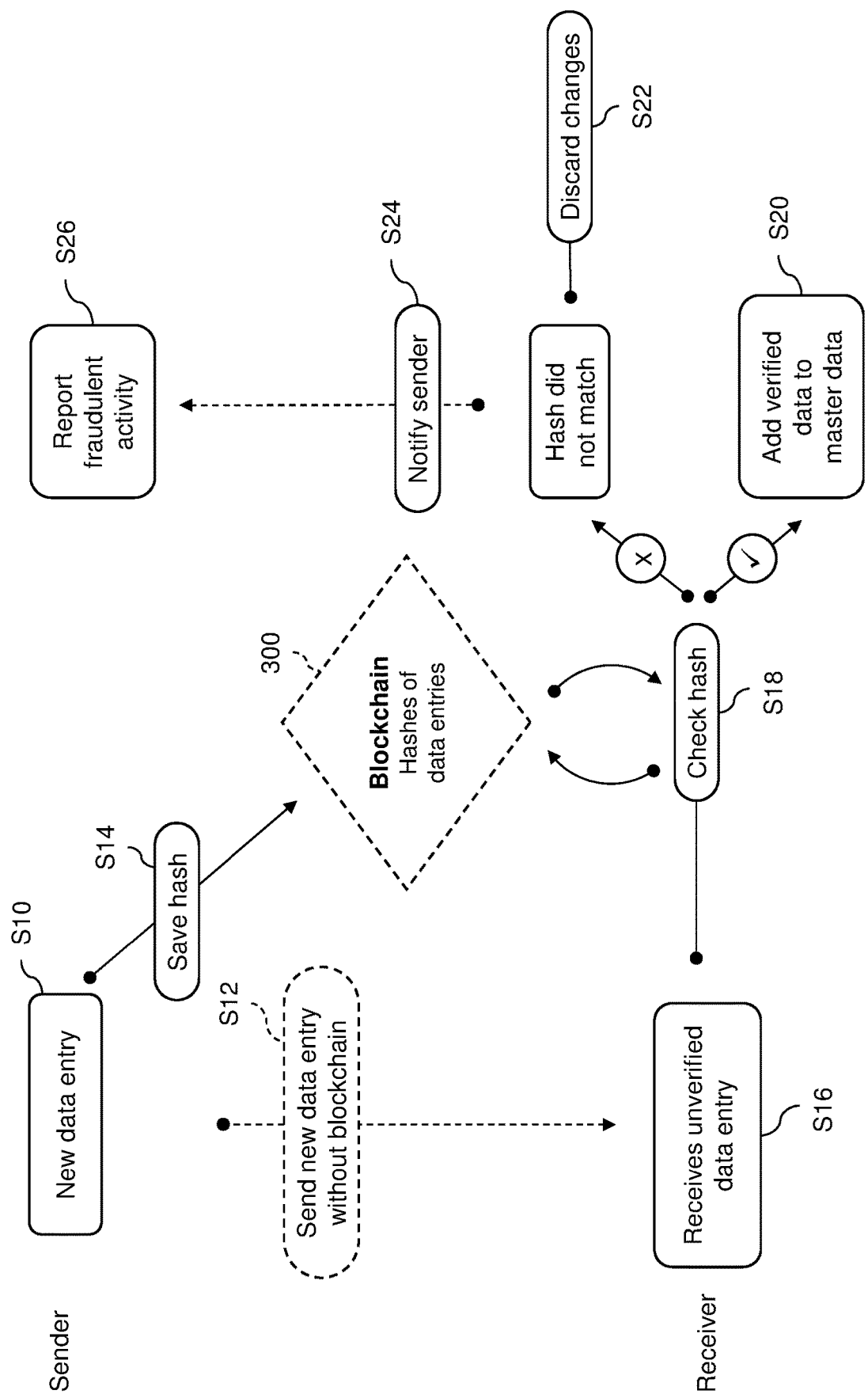
FIG. 2 shows an exemplary process for secure data exchange.

FIG. 2 shows an exemplary process for secure data exchange. The system shown in FIG. 1 may perform the exemplary process shown in FIG. 2.

When a sender (e.g. a user of the sender device 100) creates a new data entry (e.g. to add in a database managed by the ERP system 202 or to update an existing entry in the database managed by the ERP system 202) (cf. S10), the sender may send the new information included in the new data entry to a receiver (e.g. a user of the receiver device 200) via one or more communication means (e.g. via mail, e-mail, fax, etc.) that do not involve the blockchain 300 (cf. S12). When sending the new information to the receiver, the receiver may be requested to confirm the legitimacy of the new information. In some examples where the new information is sent electronically, the sender may use the sender device 100 for sending the new information to the receiver. The new information may be considered as the data to be exchanged. In some specific exemplary use cases, the sender and the receiver may belong to the same organization (e.g. a supplier company) and the new information may be new bank details (e.g. bank account information) of the organization. In these specific exemplary use cases, the receiver may have a role within the organization to give approval to the new information (e.g., the receiver may belong to a different department from the sender within the organization).

Further, the sender device 100 may generate a random value which may be a randomly-determined numerical value or include one or more characters (e.g., alphabetic characters, numeric characters, and/or any other symbols that can be processed by a computer) determined randomly. The generated random value may be represented by a string of one or more characters. The generation of the random value can be performed by the sender application. In some examples, the generated random value may be communicated to the receiver together with the data to be exchanged (e.g. the new bank details) at step S12. In other examples, the generated random value may be communicated to the receiver separately from the data to be exchanged, e.g. with a different communication means and/or a different point in time (step not shown in FIG. 2).

In addition, the sender device 100 may concatenate the data to be exchanged (e.g. new bank details) with the generated random value. In other words, the generated random value may be attached to the data to be exchanged. The sender device 100 may then obtain a hash value of the data concatenated with the random value, using a hash function. The hash function may be comprised in the sender application as one of its functions. Attaching a random value to the data to be exchanged and then obtaining the hash value of the data attached to the random value can make the resulting hash value more random and very difficult or impossible to conjecture the original data to be exchanged. In some circumstances, the random value may be referred to as a "nonce" and concatenating the data to be exchanged with the nonce may be referred to as "masking" data with a "nonce". Masking data with a nonce may be particularly advantageous in case of exchanging data that can otherwise be relatively easy to conjecture, for example, data following a specific format such as IBAN (international bank account number).

Further, the sender device 100 may digitally sign the data concatenated with the random value, using a private key of the sender, thereby generating a digital signature of the sender for the data concatenated with the random value. For example, the sender device 100 may encrypt, using the private key, the hash value of the data concatenated with the random value and the encrypted hash value may be considered as the digital signature of the sender. The sender device 100 may then store the obtained hash value and the digital signature in the blockchain 300 by operating the blockchain node BN_1 (cf. S14). The sender application may perform the generation of the hash value and the digital signature as well as storing thereof in the blockchain 300.

Further, in some examples, the sender device 100 may further store, in the blockchain 300, status information set to "pending" in association with the hash value and the digital signature. The status information may indicate a level of validity of the data used for obtaining the hash value. For instance, the status information may be set to "active" in case a specified number of receivers (of the data used for obtaining the hash value) have confirmed that the corresponding data is legitimate. The status information "active" may indicate that the corresponding data is legitimate and currently in use. This confirmation process will be described later below. Further, the status information may be set to "outdated", when the corresponding data becomes obsolete. In such a case, the sender device 100 may access the blockchain 300 and set the status information stored in association with the hash value obtained using the corresponding data to be "outdated".

When the sender device 100 stores the hash value and the digital signature (as well as the status information in the examples stated above) in the blockchain 300, the blockchain node BN_1 may send a transaction indicating the storing action and the contents of the stored information (e.g., the hash value, the digital signature, status information) to the blockchain 300 so that the transaction can be recorded in the ledger of the blockchain 300.

The receiver may receive the new data entry (e.g. the new bank details) and the random value used for obtaining the hash value at the sender device 100 via the one or more communication means that do not involve the blockchain 300 as stated above (cf. S16; see also S12). The received new data entry may be considered as data to be verified. The receiver may input the data to be verified (e.g. the new bank details) and the random value to the receiver device 100.

The receiver application installed on the receiver device 200 may concatenate the data to be verified with the random value and obtain a hash value of the data concatenated with the random value using the hash function. The hash function is the same hash function used at the sender device 100 and may be comprised in the receiver application as one of its functions. The receiver device 200 may access the blockchain 300 by operating the blockchain node BN_2 and determine whether the hash value obtained at the receiver device 200 is stored in the blockchain 300 (cf. S18). For example, the receiver device 200 may perform the determination by comparing the hash value obtained at the receiver device 200 with hash values stored in the blockchain 300. If the hash value obtained at the receiver device 200 matches (or in other words identical to) one of the hash values stored in the blockchain 300, the hash value obtained at the receiver device 200 can be determined to be stored in the blockchain 300.

When the hash value obtained at the receiver device 200 is stored in the blockchain 300, the receiver device 200 may additionally verify the digital signature of the sender, stored in the blockchain 300 in association with the hash value, using a public key of the sender. The verification may be performed using the receiver application at step S18 of FIG. 2. The public key of the sender corresponds to the private key of the sender which was used for digitally signing the data to be exchanged, concatenated with the random value. The public key of the sender may be communicated to the receiver device 200 with the data to be verified and the random value or prior to sending the data to be verified and the random value to the receiver device 200, for example. Alternatively, for example, the receiver device 200 may obtain the public key of the sender from a website of the sender. For verifying the digital signature of the sender, the receiver device 200 may decrypt the digital signature using the public key of the sender and compare the decrypted digital signature with the hash value of the data concatenated with the random value obtained by the receiver device 200, for example. If the decrypted digital signature is identical to the hash value obtained at the receiver device, the digital signature can be determined to be valid.

The determination as to whether the hash value obtained at the receiver device 200 is stored in the blockchain 300 and the verification of the corresponding digital signature of the sender may be considered as a confirmation process of the data corresponding to the hash value performed by the receiver device 200.

In case the hash value obtained at the receiver device 200 is stored in the blockchain 300 and the corresponding digital signature of the sender is determined to be valid, the received data to be verified (e.g. new bank information) may be considered as legitimate. When the received data is determined to be legitimate, it may be understood that the received data is indeed the data to be exchanged.

When the received data is determined to be legitimate, the receiver device 200 may add the received data (e.g. new bank information) in the master data, stored in the one or more databases managed by the ERP system 202 (cf. S20).

Further, in some examples, when the received data is determined to be legitimate, the receiver device 200 may digitally sign at least the received data using a private key of the receiver, thereby generating a digital signature of the receiver for the received data. For digitally signing at least the received data, the receiver device 200 may, for example, obtain a hash value of at least the received data using the hash function and encrypt the hash function with the private key of the receiver. Subsequently, the receiver device 200 may store, in the blockchain 300, the digital signature of the receiver in association with the hash value of the received data concatenated with the random value, by operating the blockchain node BN_2. The digital signature of the receiver may be considered as indicating that the receiver has confirmed that the data corresponding to the hash value is legitimate. When the receiver device 200 stores the digital signature of the receiver in the blockchain 300 in association with the hash value of the received data concatenated with the random value, a transaction indicating the storing of the digital signature of the receiver may be recorded in the ledger of the blockchain 300.

As mentioned above, in some examples, status information can be stored in the blockchain 300 in association with the hash value and the digital signature of the sender. In these examples, the receiver device 200 may further retrieve, from the blockchain 300, the status information stored in association with the hash value of the data determined to be legitimate. The receiver device 200 may, for example, store the status information in the master data for the sender, in association with and in addition to the data determined to be legitimate. Alternatively, the receiver device 200 may determine whether or not to store the received data in the master data, according to the status information. For example, the receiver device 200 may determine to store the data determined to be legitimate in the master data only if the status information is set to "active".

Further, for example, the receiver device 200 may perform the generation and storing of the digital signature of the receiver for the data determined to be legitimate only in case the status information stored in the blockchain 300 in association with the hash value corresponding to the data determined to be legitimate is set to "pending". As mentioned above, the status information may be changed from "pending" to "active" when a specified number of receivers have confirmed that the corresponding data is legitimate. Accordingly, the status information may be changed from "pending" to "active" when the specified number of digital signatures of the receivers are stored in the blockchain 300 in association with the hash value corresponding to the data determined to be legitimate. Thus, a certain period of time may pass from the point in time when the hash value corresponding to the data to be exchanged is stored in the blockchain 300 by the sender device 100 and the corresponding status information is set to "pending" to the point in time when a specified number of receivers have confirmed that the corresponding data is legitimate and the corresponding status information is changed to "active". This waiting period (in other words, confirmation period or qualifying period) before the status information is set to "active" for particular data can provide possibility for the sender to retract the data (e.g. new bank information) from the blockchain 300 before the data starts being used. In some circumstances, a few days of waiting may increase the chance of an attack being discovered and countered before leading to losses.

In case the hash value obtained at the receiver device 200 from the received data concatenated with the random value is not stored in the blockchain 300 (in other words, no hash value stored in the blockchain 300 matches the hash value obtained at the receiver device 200), the received data cannot be considered as legitimate (and is most probably fraudulent). Further, even if the hash value obtained at the receiver device 200 is stored in the blockchain 300, in case the digital signature stored in association with the blockchain 300 is determined to be invalid, the received data cannot be considered as legitimate.

Thus, in case no matching hash value is found in the blockchain 300 or the corresponding digital signature in the blockchain 300 is determined to be invalid, the receiver device 200 may determine that the received data is not legitimate, e.g. not the data to be exchanged. In case the receiver device 200 determines that the received data is not legitimate, the receiver device 200 may discard the received data (e.g. new bank details) (cf. S22).

Further, when the received data is determined to be not legitimate, the receiver device 200 may further send notification information to the sender (cf. S24). In some examples, the notification information may be sent from the receiver device 200 to the sender device 100 via the Internet. The notification information may indicate that the received data is not considered legitimate by the receiver. Alternatively or additionally, the notification information may indicate that: the hash value of the received data concatenated with the random value is not stored in the blockchain 300; or the hash value of the received data concatenated with the random value is stored in the blockchain 300 but the corresponding digital signature stored in the blockchain 300 is determined to be invalid.

When receiving the notification information from the receiver device 200, the sender may report fraudulent activity (S26).

FIG. 3 shows an example of data associated with an entry in the blockchain 300. In FIG. 3, the item "hash" indicates an exemplary hash value of data to be exchanged concatenated with a random value, stored by the sender device 100 in the blockchain 300. The item "status" of FIG. 3 indicates that the data corresponding to the exemplary hash value is "active". Accordingly, the data corresponding to the exemplary hash value shown in FIG. 3 has been confirmed as legitimate by a specified number (three in the example of FIG. 3) of receivers. Further, the item "signatures" of FIG. 3 indicates the digital signatures of the receivers stored in the blockchain 300 when respective receivers have confirmed that the corresponding data is legitimate (by performing the confirmation process as described above with reference to FIG. 2).

The exemplary data structure as shown in FIG. 3 may be considered as a mapping, where the key of the mapping is the hash value (e.g., masked and hashed data) and the values are the status and the receivers' signatures. Confirmation given to the new information by many receivers may be considered somewhat similar to the many eyes principle common in change processes.

In the specific exemplary use cases as stated above, the sender and the receiver belong to the same organization. In other specific exemplary use cases, however, the sender and the receiver may belong to different organizations. For example, the sender may be a supplier (company) and the receiver may be a buyer (company).

In the other specific exemplary use cases where the sender is a supplier and a receiver is a buyer, payment information may be exchanged, for example, when a supplier issues an invoice including bank account information and sends the invoice to a buyer. Many companies that can be suppliers may have experienced fraud based on fake paper invoices. In such fraud cases, typically paper invoices are sent to the company that look "original", but contain incorrect payment channels (in most cases an incorrect bank account number). Quite often, insiders support such fraud cases, or social engineering techniques are used to convince the Accounts Payables clerks to accept the "new" or "changed" bank account and to create pressure to pay quickly.

Further, in a supplier-buyer relationship, suppliers may change their bank details from time to time.

Accordingly, a secure process may be required to communicate such changes to their buyers. Further, it may be desirable for the buyers to facilitate proving that such changes are legit.

Figure 4:
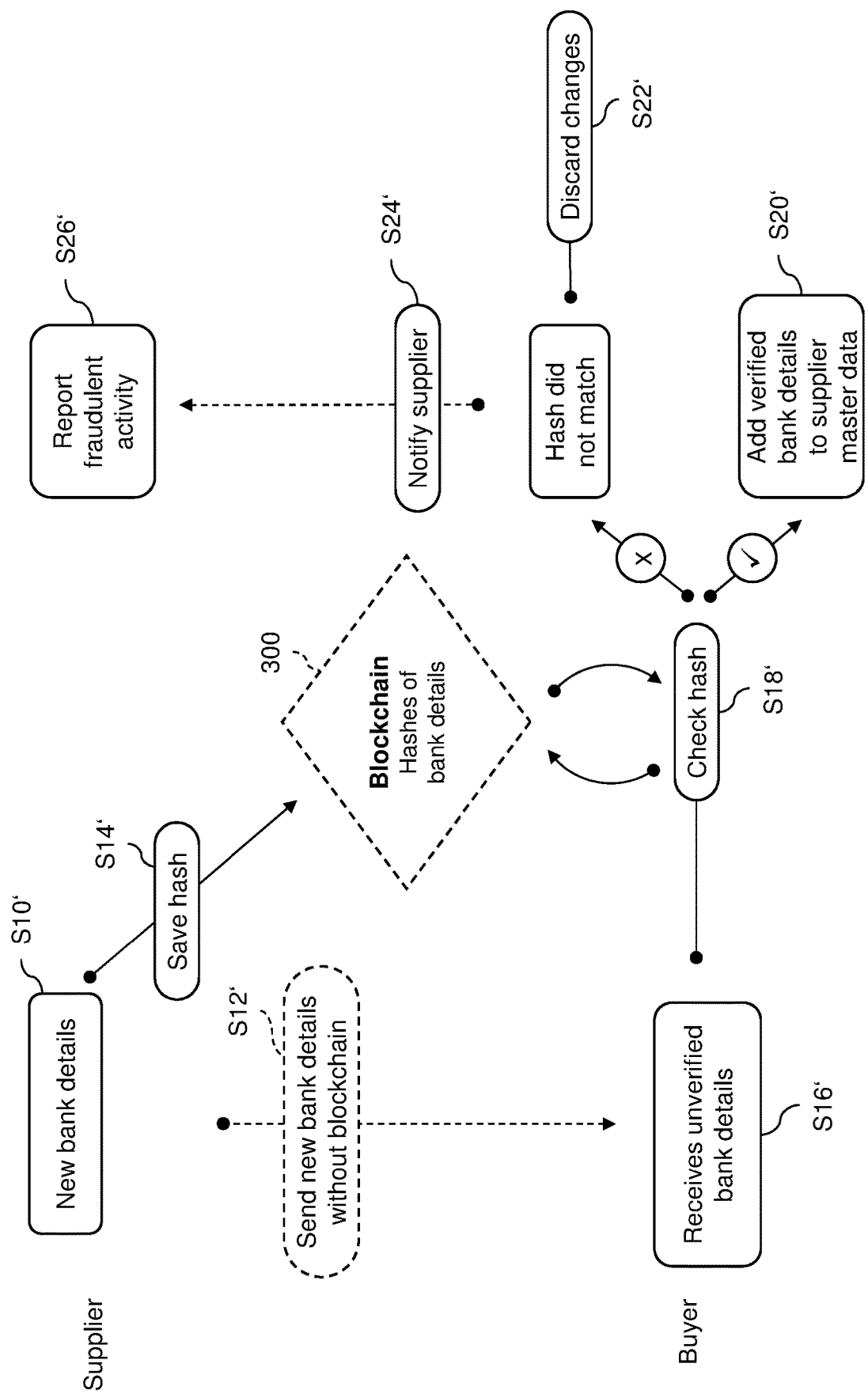
FIG. 4 shows a further exemplary process for secure data exchange.

Thus, a process analogous to the exemplary process shown in FIG. 2 may be applied in a situation where the supplier (sender) changes their bank details and communicates the change to the buyer (receiver), for example. FIG. 4 shows a further exemplary process directed to such an exemplary situation. Steps S10' to S26' shown in FIG. 4 may be considered analogous to steps S10 to S26 of FIG. 2, respectively. In this exemplary situation, the buyer may, for example, verify the received data (e.g., bank details) by checking the hash value of the received data concatenated with the random value at step S18'. The buyer, however, does not necessarily digitally sign the received data and store the digital signature in the blockchain 300 to indicate their approval, in case the received data is determined to be the data to be exchanged.

The further exemplary process as shown in FIG. 4 may be performed also in yet further different situations. For example, in case the supplier (sender) sends an invoice to the buyer (receiver), the supplier may send the invoice including the bank account information and the random number at step S12' (in a manner as described above with reference to step S12 of FIG. 2). If the hash value corresponding to the bank account information has not yet been stored in the blockchain 300, the sender device 100 may store the hash value of the bank account information concatenated with the random value in the blockchain 300 at step S14' (in a manner as described above with reference to step S14 of FIG. 2). If the hash value corresponding to the bank account information has already been stored in the blockchain 300, the sender device 200 does not need to perform step S14'. The receiver device 200 may confirm the bank account information stated in the received invoice by performing the confirmation process at steps S16' and S18' (in a manner as described above with reference to steps S16 and S18 of FIG. 2). Further, in case of processing an invoice, in some examples, the buyer may perform payment according to the invoice only when the bank account information stated on the invoice is confirmed by the confirmation process and the status information retrieved from the blockchain 300 with regards to the bank account information is set to "active".

In some circumstances, the further exemplary process as shown in FIG. 4 involving the supplier and the buyer may be performed in addition to and after the exemplary process as shown in FIG. 2 is performed within the supplier organization. In such a case, step S14' of FIG. 4 may be skipped.

Although the various specific use cases stated above are directed to exchanging payment information, the exemplary system and process may be applied for exchanging data other than payment information. The storing of the hash value of the data to be exchanged concatenated with a random value in the blockchain 300 and the confirmation process using the hash value obtained at the receiver device (e.g., buyer device) may be performed in a manner analogous to those described above with reference to FIGS. 1 to 3, regardless of the content and/or the type of the data to be exchanged.

In some variations of the exemplary system and process described above, in particular where the sender is a supplier and the receiver is a buyer, the sender device 100 may further store, in the blockchain 300, identification information of the supplier, in association with the hash value of the data concatenated with the random value and the digital signature of the supplier. The identification information of the supplier may be a name or a pseudonym of the supplier, for example. The use of the pseudonym of the supplier as the identification information may enable the supplier to hide involvement into the scheme and to hide supplier relationships, which may provide additional security. In these variations, the identification information of the supplier may be communicated to the receiver device 200 with respect to the data to be verified and the random value. When determining whether or not the hash value obtained at the receiver device 200 is stored in the blockchain 300 in the confirmation process, the receiver device 200 may compare the hash value obtained at the receiver device 200 with only the hash values stored in the blockchain 300 in association with the identification information of the relevant supplier and not with the hash values stored in association with identification information of other suppliers.

Figure 5:
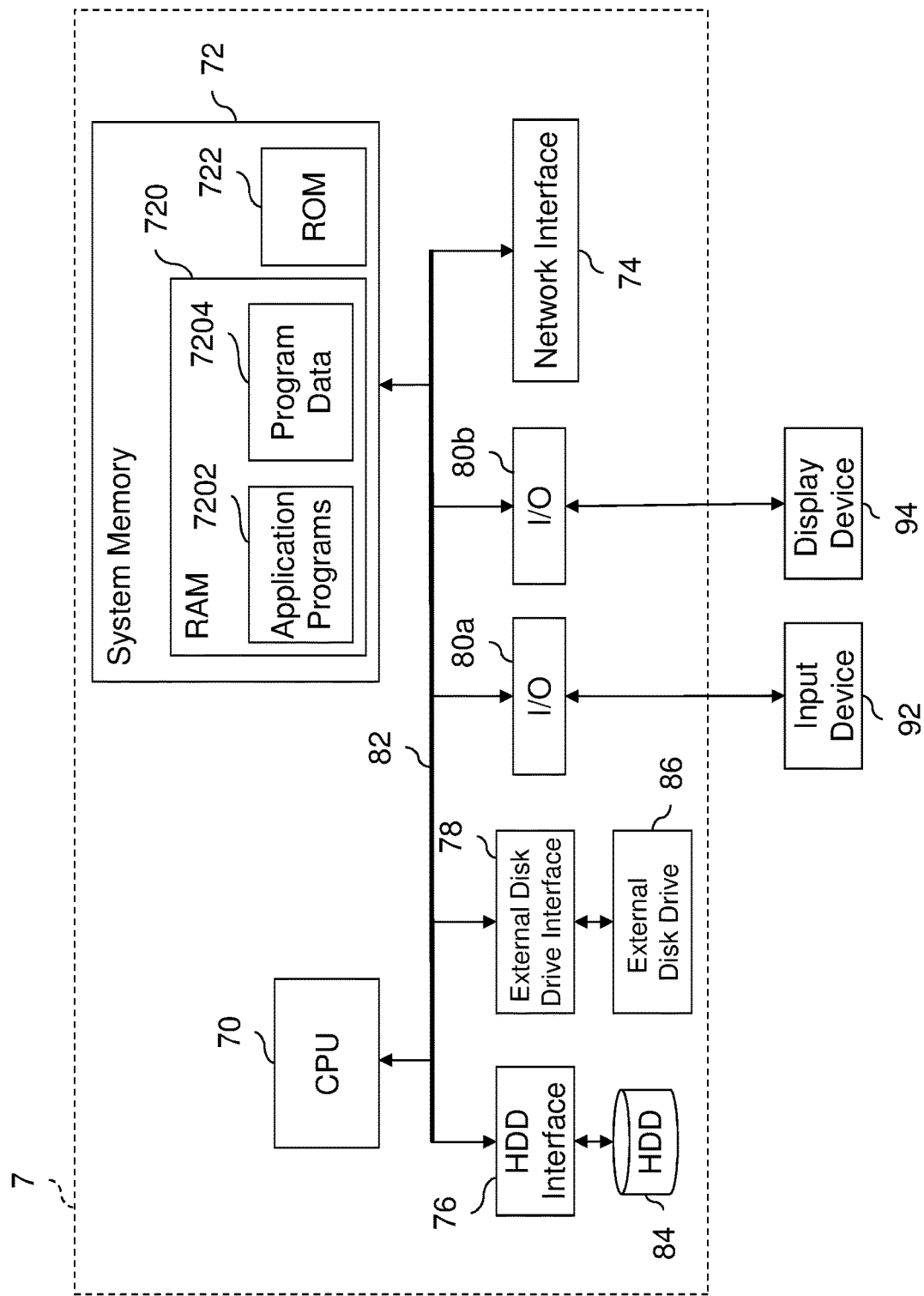
FIG. 5 shows an exemplary hardware configuration of a computer that may be used to implement exemplary embodiments and variations as described herein.

FIG. 5 shows an exemplary hardware configuration of a computer that may be used to implement the sender device 100, the receiver device 200, and/or the ERP system 202. The computer 7 shown in FIG. 5 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 5, the computer 7 may further be connected to a printer and/or an imaging device such as a camera, via corresponding I/O interfaces and the system bus 82.

In addition or as an alternative to an implementation using a computer 7 as shown in FIG. 5, a part or all of the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

The invention claimed is:

1. A method for secure data exchange, the method comprising:
   concatenating, by a sender device, data to be exchanged with a random value;
   obtaining, by the sender device, a hash value of the data to be exchanged concatenated with the random value, using a hash function;
   digitally signing, by the sender device, the data to be exchanged concatenated with the random value using a private key of a user of the sender device, thereby generating a digital signature of the user of the sender device;
   storing, in a blockchain by the sender device, the hash value generated by the sender device with the digital signature of the user of the sender device;
   receiving, by a receiver device, data to be verified and the random value without using the blockchain;
   concatenating, by the receiver device, the received data to be verified with the random value received by the receiver device;
   obtaining, by the receiver device, a hash value of the received data to be verified concatenated with the random value received by the receiver device, using the hash function;
   determining, by the receiver device, whether the hash value of the received data to be verified concatenated with the random value received by the receiver device is stored in the blockchain;
   determining, by the receiver device, that the received data to be verified matches the data to be exchanged, based on:
      the determination that the hash value of the received data to be verified concatenated with the received random value is stored in the blockchain; and
      a verification of the digital signature of the user of the sender device stored in the blockchain with the hash value generated by the sender device using a public key of the user of the sender device.

2. The method according to claim 1, further comprising:
   in response to the receiver device determining that the received data to be verified matches the data to be exchanged:
      digitally signing, by the receiver device, at least the received data to be verified using a private key of a user of the receiver device, thereby generating a digital signature of the user of the receiver device; and
      storing, in the blockchain by the receiver device, the digital signature of the user of the receiver device, in association with the hash value of the received data to be verified concatenated with the received random value.

3. The method according to claim 1, wherein status information is further stored in the blockchain in association with the hash value of the data to be exchanged concatenated with the random value;
   wherein the status information is set to pending when the sender device stores the hash value with the digital signature of the user of the sender device in the blockchain; and
   wherein the status information is changed from pending to active when a specified number of digital signatures are stored, by one or more receiver devices, in the blockchain in association with the hash value of the data concatenated with the random value.

4. The method according to claim 1, further comprising:
   storing, by the receiver device, the received data to be verified in a receiver database connected to the receiver device, in response to the receiver device determining that the received data to be verified matches the data to be exchanged.

5. The method according to claim 1, further comprising:
   determining, by the receiver device, that the received data to be verified is not a match to the data to be exchanged, based on:
      the hash value of the received data to be verified concatenated with the received random value is not stored in the blockchain; or the hash value of the received data to be verified concatenated with the received random value is stored in the blockchain but the digital signature of the user of the sender device stored in the blockchain in with the hash value generated by the sender device is not verified using the public key of the user of the sender device; and in response to if the receiver device determining that the received data to be verified does not match the data to be exchanged, sending notification information from the receiver device to the sender device.

6. A receiver device for secure data exchange, comprising:
a memory configured to store a public key corresponding to a private key of a user of a sender device; and
a processor configured to:
receive data to be verified and a random value without using a blockchain;
concatenate the received data to be verified with the received random value received by the receiver device;
obtain a hash value of the received data to be verified concatenated with the random value received by the receiver device, using a hash function;
determine whether the hash value of the received data to be verified concatenated with the received random value is stored in the blockchain, the blockchain storing hash values with digital signatures, at least one of the stored hash values being obtained by the sender device by concatenating data to be exchanged with the random number and using the hash function on the data to be exchanged concatenated with the random value to digitally sign, by the sender device, the data to be exchanged concatenated with the random number, using the private key of the user of the sender device;
determine that the received data to be verified matches the data to be exchanged, based on:
the determination that the hash value of the received data to be verified concatenated with the received random value is stored in the blockchain; and
a verification of the digital signature of the sender device stored in the blockchain using the public key stored in the memory corresponding to the private key of the user of the sender device.

7. The receiver device according to claim 6, wherein the memory is further configured to store a private key of a user of the receiver device; and
wherein the processor is further configured to:
in response to the receiver device determining that the received data to be verified matches the data to be exchanged:
digitally sign at least the received data to be verified using the private key stored in the memory, thereby generating a digital signature of the user of the receiver device; and
store, in the blockchain, the digital signature of the user of the receiver device, in association with the hash value of the received data to be verified concatenated with the received random value.

8. The receiver device according to claim 6, wherein the processor is further configured to:
store the received data to be verified in a receiver database connected to the receiver device, in response to the received data to be verified being determined to match the data to be exchanged.

9. The receiver device according to claim 6, wherein the processor is further configured to:

determine that the received data to be verified is not a match to the data to be exchanged, based on:
the hash value of the received data to be verified concatenated with the received random value is not stored in the blockchain; or
the hash value of the received data to be verified concatenated with the received random value is stored in the blockchain but the digital signature stored in the blockchain with the hash value generated by the sender device is not verified using the public key of the user of the sender device; and
in response to determining the received data to be verified does is does not match the data to be exchanged, send notification information to the sender device.

10. A method performed by a receiver device for secure data exchange, the method comprising:
receiving data to be verified and a random value without using a blockchain;
concatenating the received data to be verified with the received random value received by the receiver device;
obtaining a hash value of the received data to be verified concatenated with the received random value received by the receiver device, using a hash function;
determining whether the hash value of the received data to be verified concatenated with the received random value is stored in the blockchain, the blockchain storing hash values with digital signatures, at least one of the stored hash values being obtained, by a sender device by concatenating data to be exchanged with the random number and using the hash function on the data to be exchanged concatenated with the random value, the digital signature stored with the at least one of the stored hash values being obtained by the sender device to digitally sign, by the sender device, the data to be exchanged concatenated with the random number, using a private key of the user of the sender device;
determining that the received data is the data to be exchanged, based on:
the determination that the hash value of the received data to be verified concatenated with the received random value is stored in the blockchain; and
a verification that the digital signature of the sender device stored in the blockchain using a public key of the user of the sender device.

11. A non-transitory, computer readable medium having executable instructions stored therein, the medium comprising:
instructions to concatenate, by a sender device, data to be exchanged with a random value;
instructions to obtain, by the sender device, a hash value of the data to be exchanged concatenated with the random value, using a hash function;
instructions to digitally sign, by the sender device, the data to be exchanged concatenated with the random value using a private key of a user of the sender device, thereby generating a digital signature of the user of the sender device;
instructions to store, in a blockchain by the sender device, the hash value generated by the sender device with the digital signature of the user of the sender device;
instructions to receive, by a receiver device, data to be verified and the random value without using the blockchain;
instructions to concatenate, by the receiver device, the received data to be verified with the random value received by the receiver device;

instructions to obtain, by the receiver device, a hash value of the received data to be verified concatenated with the random value received by the receiver device, using the hash function;

instructions to determine, by the receiver device, whether the hash value of the received data to be verified concatenated with the random value received by the receiver device is stored in the blockchain;

instructions to determine, by the receiver device, that the received data to be verified matches the data to be exchanged, based on:

the determination that the hash value of the received data to be verified concatenated with the received random value is stored in the blockchain; and a verification of the digital signature of the user of the sender device stored in the blockchain with the hash value generated by the sender device using a public key of the user of the sender device.

12. The non-transitory, computer readable medium according to claim 11, further comprising:

in response to the receiver device determining that the received data to be verified is matches the data to be exchanged:

instructions to digitally sign, by the receiver device, at least the received data to be verified using a private key of a user of the receiver device, thereby generating a digital signature of the user of the receiver device; and instructions to store, in the blockchain by the receiver device, the digital signature of the user of the receiver device, in association with the hash value of the received data to be verified concatenated with the received random value.

13. The non-transitory, computer readable medium according to claim 11, wherein status information is further stored in the blockchain in association with the hash value of the data to be exchanged concatenated with the random value;

wherein the status information is set to pending when the sender device stores the hash value with the digital signature of the user of the sender device in the blockchain; and wherein the status information is changed from pending to active when a specified number of digital signatures are stored, by one or more receiver devices, in the blockchain in association with the hash value of the data concatenated with the random value.

14. The non-transitory, computer readable medium according to claim 11, further comprising:

instructions to store, by the receiver device, the received data to be verified in a receiver database connected to the receiver device, in response to the receiver device determining that the received data to be verified matches the data to be exchanged.

15. The non-transitory, computer readable medium according to claim 11, further comprising:

instructions to determine, by the receiver device, that the received data to be verified is not a match to the data to be exchanged, based on:

the hash value of the received data to be verified concatenated with the received random value is not stored in the blockchain; or the hash value of the received data to be verified concatenated with the received random value is stored in the blockchain but the digital signature of the user of the sender device stored in the blockchain in with the hash value generated by the sender device is not verified using the public key of the user of the sender device; and in response to the receiver device determining that the received data to be verified does not match the data to be exchanged, sending notification information from the receiver device to the sender device.

* * * * *